United States Patent Office 3,645,991
Patented Feb. 29, 1972

3,645,991
VINYLIDENE FLUORIDE COPOLYMERS HAVING IMPROVED RESISTANCE TO HEAT-AGING
Arthur Nersasian, Wilmington, Del., assignor to E. I. du Pont de Nemours and Company, Wilmington, Del.
No Drawing. Filed Apr. 2, 1970, Ser. No. 25,286
Int. Cl. C08f 1/62
U.S. Cl. 260—80.77
6 Claims

ABSTRACT OF THE DISCLOSURE

Vinylidene fluoride copolymers having improved resistance to heat-aging are prepared by polymerization in an aqueous medium in the presence of a catalyst system of (a) a water-soluble inorganic peroxy compound capable of initiating polymerization of the monomers, and (b) a water-soluble hypophosphite.

BACKGROUND OF THE INVENTION

Elastomeric copolymers of vinylidene fluoride and at least one other ethylenically unsaturated fluorinated monomer, said copolymers hereinafter referred to as vinylidene fluoride copolymers, are known to have excellent oil and grease resistance and to withstand high temperatures better than other elastomers. Because of this exceptional behavior said vinylidene fluoride copolymers are used in a wide variety of high temperature applications. For example, O-rings made from said copolymers are employed to seal lubricants for high-speed bearings in jet engines where temperatures can reach 315° C. Typically vinylidene fluoride copolymers are prepared using a polymerization catalyst comprised of a water soluble peroxide compound and a water soluble reducing agent. Despite their excellent properties, such vinylidene fluoride copolymer elastomers do, after prolonged exposure to high temperatures, suffer a deterioration in mechanical properties and consequently tend to become brittle, and it is therefore desirable to improve the resistance to heat-aging of such vinylidene copolymer elastomeric compositions.

THE INVENTION

In accordance with this invention, vinylidene fluoride copolymers having surprisingly superior heat-aged vulcanizate properties are prepared by polymerization of the monomers in an aqueous medium in the presence of a catalyst system of (a) a water-soluble inorganic peroxy compound capable of initiating polymerization of the monomers and (b) a water-soluble hypophosphite.

This invention is applicable to the preparation of interpolymers of vinylidene fluoride (VF$_2$) with at least one other fluorine containing ethylenically unsaturated co-monomer. Suitable comonomers are disclosed in U.S. Patents 3,318,854 to Honn et al. and 3,347,636 to Nersasian. Typical of the latter are hexafluoropropene (HFP), tetrafluoroethylene (TFE), perfluoroalkyl perfluorovinyl ethers [particularly those in which the alkyl radical contains from one to about four carbon atoms such as perfluoro(methyl vinyl ether) and perfluoro(propylvinyl ether)], trifluorochloroethylene and pentafluoropropylene.

Perfluorinated ethylenically unsaturated comonomers of about 2–10 carbon atoms are preferred. Of particular interest are the vinylidene fluoride/hexafluoropropene copolymers containing from about 70 to about 30 weight percent vinylidene fluoride and about 30 to about 70 weight percent hexafluoropropene as disclosed in U.S. Patent 3,051,677 to Rexford. Other polymers prepared by the process of this invention are the terpolymers of vinylidene fluoride/hexafluoropropene/tetrafluoroethylene wherein the monomer units are present in the following mole ratios: about 3 to 35 (preferably 15 to 25) weight percent tetrafluoroethylene units and about 97 to 65 (preferably 85 to 75) weight percent vinylidene fluoride and hexafluoropropene units, the latter two being present in a weight ratio of from about 2.3:1 to 0.6:1 as disclosed in U.S. Patent 2,968,649 to Pailthorp and Schroeder.

One component of the catalyst system must be a water-soluble inorganic peroxy compound capable of initiating polymerization of the monomers. Mixtures of such compounds can also be used. Suitable peroxy catalysts include, for example, alkali metal persulfates, ammonium persulfates, alkali metal perborates, alkali metal peroxides and hydrogen peroxide. Preferred are water-soluble persulfates, especially ammonium, Na, and K persulfate. Compounds which exhibit low activity in initiating polymerization of the monomers in the system employed are much less preferred, for example, sodium perborate, sodium peroxide, and hydrogen peroxide.

The second component of the catalyst system must be a water-soluble hypophosphite. Suitable hypophosphites include, for example, ammonium and alkali metal hypophosphites. Sodium hypophosphite is preferred.

A wide range of reaction conditions and catalyst concentrations can be employed to prepare vinylidene fluoride copolymers in accordance with the process of the present invention. Generally the polymerization procedures described in U.S. Patent 3,053,818 to Honn et al., U.S. Patent 2,774,751 to Passino et al., and U.S. Patent 2,689,-241 to Dittman et al. can be employed.

Conveniently, in practical operations the mole ratio of peroxy compound to hypophosphite employed in the catalyst system is at least about 1/1 and about one part by weight of the catalyst system per 100 parts of monomers is employed.

Polymerization can be carried out in either a batch or continuous process conveniently at a temperature of about 60–160° C., preferably 100–120° C., and at a pressure of at least about 28 kg./sq. cm. While there is not upper limit on pressure, it is preferred, particularly for a continuous process, that the pressure range from about 56 to about 70 kg./sq. cm.

The vinylidene fluoride copolymers prepared in accordance with this invention, after curing, display resistance to heat-aging which is unexpectedly superior to that displayed by vinylidene fluoride copolymers prepared by methods of the prior art. Curing of the elastomeric compositions prepared by this invention is effected by conventional methods and under the usual conditions.

The following examples illustrate the invention. All parts, percentages and proportions are by weight unless otherwise indicated.

Examples 1 to 4

Using the conventional method described below, four runs are made using the proportions of reactants shown in Table I. Typical results are given therein as indicated.

Continuous polymerization procedure.—Gaseous vinylidene fluoride and hexafluoropropylene are measured through rotameters, mixed in a pipe line, compressed to approximately 63 kg./sq. cm. and passed through a heated line to the reactor which is a "Type 316" stainless steel agitated autoclave with a free space volume of 1000 cc. Aqueous solutions of catalyst are metered from separate reservoirs and introduced into the autoclave through separate lines. The autoclave is operated liquid-full and is equipped with a take-off in the lid. The normal operating temperature range of the autoclave is about 100° C. to 115° C. An agitator is employed to give sufficient mixing to obtain a homogeneous emulsion. Overflow from the autoclave is passed through a pressure reducer which releases the polymerization mass at atmospheric pressure. Copolymer product is coagulated, the aqueous catalyst phase is discarded, and the raw copolymer is dried on a rubber mill heated to about 100° C. The copolymer consists of about 60 weight percent vinylidene fluoride units and about 40 weight percent hexafluoropropylene units.

TABLE I

Monomer feed composition:
Vinylidene fluoride _____ 57% by weight.
Hexafluoropropylene _____ 43% by weight.
Monomer feed rate _____ 1.8-2.1 kg./hr.
Deionized water feed rate _____ 6,000-6,600 ml./hr.
Pressure, kg./sq. cm _____ 63-67.
$(NH_4)_2S_2O_8$ _____ 25 g./hr.
$NaH_2PO_2 \cdot H_2O$ and $NaHSO_3$ _____ As shown.
Temperature (° C.) _____ 106-108.

|  | Example | | | |
|---|---|---|---|---|
|  | 1[1] | 2[1] | 3 | 4 |
| $(NH_4)_2S_2O_8$ (g./hr.) | 25 | 25 | 25 | 25 |
| $NaHSO_3$ (g./hr.) |  | 5 |  |  |
| $NaH_2PO_2 \cdot H_2O$ (g./hr.) |  |  | 4 | 6 |

[1] Outside the invention; for comparison only.

The copolymers of Examples 1–4 are compounded as follows. About 100 parts of copolymer is compounded on a water-cooled two roll mill with 10–15 parts of magnesium oxide, 20–30 parts of MT black and 1.5 parts of hexamethylenediamine carbamate. The compounded stock is placed on a mold and cured in a press for 0.5 hour at 148–163° C. and then removed from the mold and placed in an oven for 18–24 hours at 204° C. to complete the cure. The mechanical properties of the vulcanizates so prepared are then determined in accordance with Standard ASTM methods. Results appear in Table II.

TABLE II.—ORIGINAL PROPERTIES OF CURED POLYMERS

|  | Example | | | |
|---|---|---|---|---|
|  | 1[1] | 2[1] | 3 | 4 |
| Tensile at break (kg./sq. cm.) | 170 | 202 | 165 | 164 |
| Elongation at break (percent) | 230 | 200 | 180 | 180 |
| Modulus at 100% elongation (kg./sq. cm.) | 36 | 60 | 61 | 61 |

[1] For comparison, copolymers of Examples 1 and 2 are not within the scope of this invention.

In order to determine the heat-aged properties of the cured copolymers, the properties of said copolymers are determined after three days at 260° C. Results are given in Table III.

TABLE III.—PROPERTIES OF CURED COPOLYMERS AFTER 3 DAYS AT 260° C.

|  | Example | | | |
|---|---|---|---|---|
|  | 1[1] | 2[1] | 3 | 4 |
| Tensile at break (kg./sq. cm.) | 86 | 112 | 139 | 126 |
| Elongation at break (percent) | 140 | 140 | 190 | 180 |
| Modulus at 100% elongation (kg./sq. cm.) | 71 | 77 | 67 | 67 |

[1] For comparison, copolymers of Examples 1 and 2 are not within the scope of this invention.

The above data presented in Tables II and III illustrate that the copolymers prepared according to this invention, e.g., Examples 3 and 4, resist heat-aging in that there is little or no change in the elongation at break or in the modulus at 100% elongation and in that a higher percent of the original tensile strength at break is retained.

Example 5

To determine if the good heat-aged properties of Examples 3 and 4 were due to the presence of $NaH_2PO_2 \cdot H_2O$ rather than to polymer end groups derived from the hypophosphite, a portion of copolymer emulsion from Example 1 was mixed with sodium hypophosphite (Example 5) to obtain the same copolymer/hypophosphite ratio as represented by Example 4. The data in Table IV show that the presence of the hypophosphite per se does not improve the heat-aged properties of Example 1 as did the use of the hypophosphite as a reducing agent with presence of $(NH_4)_2S_2O_8$ to prepare the copolymer as shown by Example 4.

TABLE IV.—ORIGINAL PROPERTIES

|  | Example | |
|---|---|---|
|  | 1[1] | 5[1] |
| Tensile at break (kg./sq. cm.) | 170 | 180 |
| Elongation at break (percent) | 230 | 260 |
| Modulus at 100% elongation (kg./sq. cm.) | 36 | 37 |
| Properties after 3 days at 260° C. | | |
| Tensile at break (kg./sq. cm.) | 86 | 93 |
| Elongation at break (percent) | 140 | 140 |
| Modulus at 100% elongation (kg./sq. cm.) | 71 | 71 |

[1] Outside the invention for comparison only.

Examples 6–9

Examples 7–9 show that the good heat-aged properties shown by Examples 3 and 4 are not due to the presence of sodium hypophosphite per se in the cure recipe. A copolymer made with the $(NH_4)_2S_2O_8/NaHSO_3$ catalyst system, as illustrated by Example 2, was cured in the presence of various amounts of sodium hypophosphite added to the curing system. The data in Table IV show that the poor heat-aged properties of the control sample, Example 6, were not improved by the presence of sodium hypophosphite. On the contrary, the heat-aged tensile strengths and elongations of stocks cured in the presence of sodium hypophosphite (Examples 7–9) were actually poorer than those of the control.

TABLE V.—ORIGINAL PROPERTIES

|  | Example | | | |
|---|---|---|---|---|
|  | 6[1] | 7[1] | 8[1] | 9[1] |
| $NaH_2PO_2 \cdot H_2O$ (phpr.) | 0 | 1 | 2 | 3 |
| Tensile at break (kg./sq. cm.) | 217 | 140 | 137 | 140 |
| Elongation at break (percent) | 185 | 160 | 140 | 140 |
| Modulus at 100% elongation (kg./sq. cm.) | 91 | 67 | 53 | 77 |
| Properties after 3 days at 260° C. | | | | |
| Tensile at break (kg./sq. cm.) | 172 | 95 | 88 | 77 |
| Elongation at break (percent) | 140 | 100 | 100 | 60 |
| Modulus at 100% elongation (kg./sq. cm.) | 121 | 95 | 88 | 77 |

[1] Outside the invention, for comparison only.

I claim:

1. In a process for the preparation of elastomeric copolymers of vinylidene fluoride and at least one other ethylenically monounsaturated fluorine containing comonomer by polymerization in an aqueous medium in the presence of at least about one part by weight per 100 parts by weight monomers of a catalyst system of (a) a water-soluble inorganic peroxy compound capable of initiating polymerization of the monomers and (b) a water-soluble reducing agent; the improvement which consists essentially of using as the reducing agent a water-soluble hypophosphite, the mole ratio of peroxy compound to hypophosphite in said catalyst system being at least about 1/1.

2. The process of claim 1 wherein a comonomer is hexafluoropropene, tetrafluoroethylene, a perfluoroalkyl perfluorovinyl ether, trifluorochloroethylene or pentafluoropropene.

3. The process of claim 1 wherein a perfluorinated comonomer of about 2–10 carbon atoms is employed.

4. The process of claim 3 wherein hexafluoropropene is employed.

5. The process of claim 3 wherein hexafluoropropene and tetrafluoroethylene are employed.

6. The process of claim 3 wherein component (a) is Na, K, or ammonium persulfate and component (b) is sodium hypophosphite.

(References on following page)

References Cited

UNITED STATES PATENTS

| | | | |
|---|---|---|---|
| 2,689,241 | 9/1954 | Dittman et al. | 260—87.5 |
| 2,774,751 | 12/1956 | Passino et al. | 260—87.5 |
| 3,053,818 | 9/1962 | Honn et al. | 260—80.5 |
| 3,193,539 | 7/1965 | Hauptshein | 260—87.7 |
| 3,235,537 | 2/1966 | Albin et al. | 260—80.5 |
| 3,280,086 | 10/1966 | Nakajima et al. | 260—85.5 |
| 3,380,977 | 4/1968 | Helfrich et al. | 260—87.5 |
| 3,401,155 | 9/1968 | Borsini et al. | 260—87.7 |
| 3,467,636 | 9/1969 | Nersasian | 260—80.77 |

JOSEPH L. SCHOFER, Primary Examiner

S. M. LEVIN, Assistant Examiner

U.S. Cl. X.R.

260—41 B, 80.76, 87.7